United States Patent
Lee

(10) Patent No.: US 9,063,600 B2
(45) Date of Patent: Jun. 23, 2015

(54) METHOD FOR CARRYING OUT EDGE ETCHING AND STRENGTHENING OF OGS (ONE-GLASS-SOLUTION) TOUCH PANEL WITH ONE-TIME FILM LAMINATION

(71) Applicant: GHITRON TECHNOLOGY CO., LTD., Hsinchu (TW)

(72) Inventor: Chun-Yuan Lee, Hsinchu (TW)

(73) Assignee: Ghitron Technology Co., Ltd., Chutung Hsinchu (TW)

( * ) Notice: Subject to any disclaimer, the term of this patent is extended or adjusted under 35 U.S.C. 154(b) by 0 days.

(21) Appl. No.: 14/330,039

(22) Filed: Jul. 14, 2014

(65) Prior Publication Data

US 2015/0122773 A1 May 7, 2015

(30) Foreign Application Priority Data

Nov. 1, 2013 (TW) .............................. 102139716 A

(51) Int. Cl.
  *B44C 1/22* (2006.01)
  *C03C 15/00* (2006.01)
  *C03C 25/68* (2006.01)
  *G06F 3/041* (2006.01)
(52) U.S. Cl.
  CPC ...... *G06F 3/041* (2013.01); *G06F 2203/04103* (2013.01)

(58) Field of Classification Search
  USPC ....................................................... 216/33, 13
  See application file for complete search history.

(56) References Cited

U.S. PATENT DOCUMENTS

2012/0313884 A1* 12/2012 Huang et al. .................. 345/174

* cited by examiner

*Primary Examiner* — Roberts Culbert
(74) *Attorney, Agent, or Firm* — Rosenberg, Klein & Lee

(57) ABSTRACT

Disclosed is a method for carrying out edge etching and strengthening of an OGS (One-Glass-Solution) touch panel with one-time film lamination. After a prepared large glass sheet has been subjected to a first strengthening treatment, a plurality of touch control circuits and peripheral frames of black, white, or other colors associated with the touch control circuits are laid on a surface of the large glass sheet. Afterwards, an upper lamination film and a lower lamination film are respectively laminated on surfaces of the large glass sheet with a plurality of preservation zones and cutting zones defined therein and are subjected to film cutting to form cut lines. The cutting zones of the upper lamination film and the lower lamination film are peeled off along the cut lines. Then, the large glass sheet is cut into a plurality of small glass cells along the cut lines of the cutting zones. Side edges of the small glass cells are then subjected to etching and strengthening. During the etching and strengthening of the side edges, the small glass cells are also subjected to edge smoothening and edge flattening.

5 Claims, 5 Drawing Sheets

METHOD FOR CARRYING OUT EDGE ETCHING AND STRENGTHENING OF OGS (ONE-GLASS-SOLUTION) TOUCH PANEL WITH ONE-TIME FILM LAMINATION

BACKGROUND OF THE INVENTION

1. Field of the Invention

The present invention relates to a method for etching and strengthening a side edge of an OGS (One-Glass-Solution) touch panel, and in particular to a method for carrying out edge etching and strengthening of an OGS touch panel with one-time film lamination.

2. The Related Arts

Touch screens have very wide applications, such as tablet computers, mobile phones, notebook computers, tourist guide systems, and vending machines. Such an interface is convenient and requires no additional input device and is straightforward for general users so that the market thereof is still expanding and various novel styles have been proposed. According to the operation principles that are employed to detect the touch points, the touch screens are classified as resistive screens, capacitive screens, optic type screens, and wave type screens, among which the capacitive screens are most widely used in the current market.

A conventional touch screen is composed of two electrically conductive layers between which spacers and electrodes are arranged. The top layer is often a plastic sheet of polyesters that has inner surface on which an electrically conductive metal layer is formed, while the bottom layer is a glass substrate carrying an electrically conductive material. Formed between and spacing the glass substrate and the polyester sheet is another layer that is a tiny spacer layer made up of smaller plastic spacers made of polyester and forms a plurality separation lines. The separation lines extend on the glass substrate to define an X-axis, while a Y-axis is formed on the polyester sheet. When a point of a finger or a stylus applies a force to the touch screen, an electronic controller arranged beside the electrically conductive layers detects the X-axis and Y-axis coordinates of the touch point and a response is made on the screen.

The mainstream of the current touch screen market is OGS (One/Single Glass Solution), which is also referred to as Touch on Lens. The OGS touch panels have advantages of cost and manufacture and satisfy the demands of electronic technology products for being light-weighted, thin, and compact for the outside appearance thereof. The international manufacturers of mobile phones and tablet computers all start to use it one after one.

The OGS touch panel is generally structured by combining a touch glass sheet with a protective glass sheet to form a single glass sheet, wherein touch sensors are directly formed on the protective glass sheet, so that the touch function that is provided by the touch glass sheet and the strength that is provided by the protective glass sheet are integrated on the same single glass sheet.

The OGS touch panel comprises multiple electrically conductive layers coated on an inner surface of the protective glass sheet to reduce the amount of glass used, simplify a lamination process of touch control modules, and thus improve the yield rate of manufacture. In addition to the reduction of cost, most importantly, the glass sheets used can be made relatively light-weighted, thin, and small, having a substantial reduction of thickness and weight as compared to the two-glass-sheet structures, so as to better suit the needs of the touch screen market and also enhance light transmittance, and posing no issue of necessary modification of the existing manufacturing processes for LCD panels, and allowing for production in a small-volume large-variety manner. The OGS touch panels are superior, in respect of material and software and hardware manufacturing techniques, to the conventional two-glass-sheet-laminated substrates (G/G type) and glass-film laminated substrates (G/F type).

However, the OGS touch panels still suffer certain issues of manufacturing processes thereof, which should be properly handled. For example, a major difficult of the OGS manufacturing process is how to eliminate edge defects of glass sheets. A conventional manufacturing process is such that an OGS touch panel, after being subjected to cutting, is laminated with a protective film and is then subjected to a strengthening operation. However, in such a conventional way of manufacturing, it needs to perform several times of film replacement. This requires substantial facility and manpower for film replacement and the cost is high. Further, problems, such as scratches, contamination, surface damages of glass sheets, and damages of circuits, may occur during the replacement of the films.

Cutting the reinforced glass sheets in the manufacturing processes in generally difficult for the reinforced glass sheets have hardness higher than the regular glass sheets. This may cause high wear of the cutting tools. Thus, the expense of cutting is high and the yield rate is low. Further, it often occurs that the cutting processes cause cracking and breaking in edges of the reinforced glass sheets, leading to capillary and tiny fractures. Such fractures greatly lower the strength of the glass sheet. A solution that is commonly adopted in some manufacturing processes is to first cut and then reinforce, and afterwards, film lamination and etching are carried out. Such a solution still suffers a low efficiency and a high expense for mass production.

SUMMARY OF THE INVENTION

In view of the above-discussed drawbacks of the conventional manufacturing processes of OGS touch panels, the primary object of the present invention is to provide a method for carrying out edge etching and strengthening of an OGS touch panel with one-time film lamination, in which manufacturing of a touch panel is carried out with a one-time operation of film lamination film.

To achieve the above object, the present invention provides a method, in which after a prepared large glass sheet has been subjected to a first strengthening treatment, a plurality of touch control circuits and peripheral frames associated with the touch control circuits are laid on a surface of the large glass sheet. Afterwards, an upper lamination film and a lower lamination film are respectively laminated on surfaces of the large glass sheet with a plurality of preservation zones and cutting zones defined therein and are subjected to film cutting to form cut lines. The cutting zones of the upper lamination film and the lower lamination film are peeled off along the cut lines. Then, the large glass sheet is cut into a plurality of small glass cells along the cut lines of the cutting zones. Side edges of the small glass cells are then subjected to etching and strengthening.

In a preferred embodiment of the present invention, during the etching and strengthening of the side edges of the small glass cells, tiny fractures and unrecognizable cracking in the side edges of the glass sheet can be removed from the small glass cells so as to also achieve edge smoothening and edge flattening for the small glass cells.

The major technical feature of the present invention is that the films, after laminated, is kept to the end of the process of the method, wherein before a glass sheet is cut, a one-time operation of film lamination is carried on the glass sheet and then cutting of a specific way is carried out so as to keep the lamination films within predetermined preservation zones, allowing them to be further used in the subsequent operations.

The present invention provides a method for carrying out edge etching and strengthening of an OGS touch panel with one-time film lamination, which eliminates the needs of replacing the lamination films in each step so as to simplify the process, reduce the risks of scratching the touch panel glass and contamination during the replacement of the films, and also save the facility cost and processing time necessary for multiple times of film lamination.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
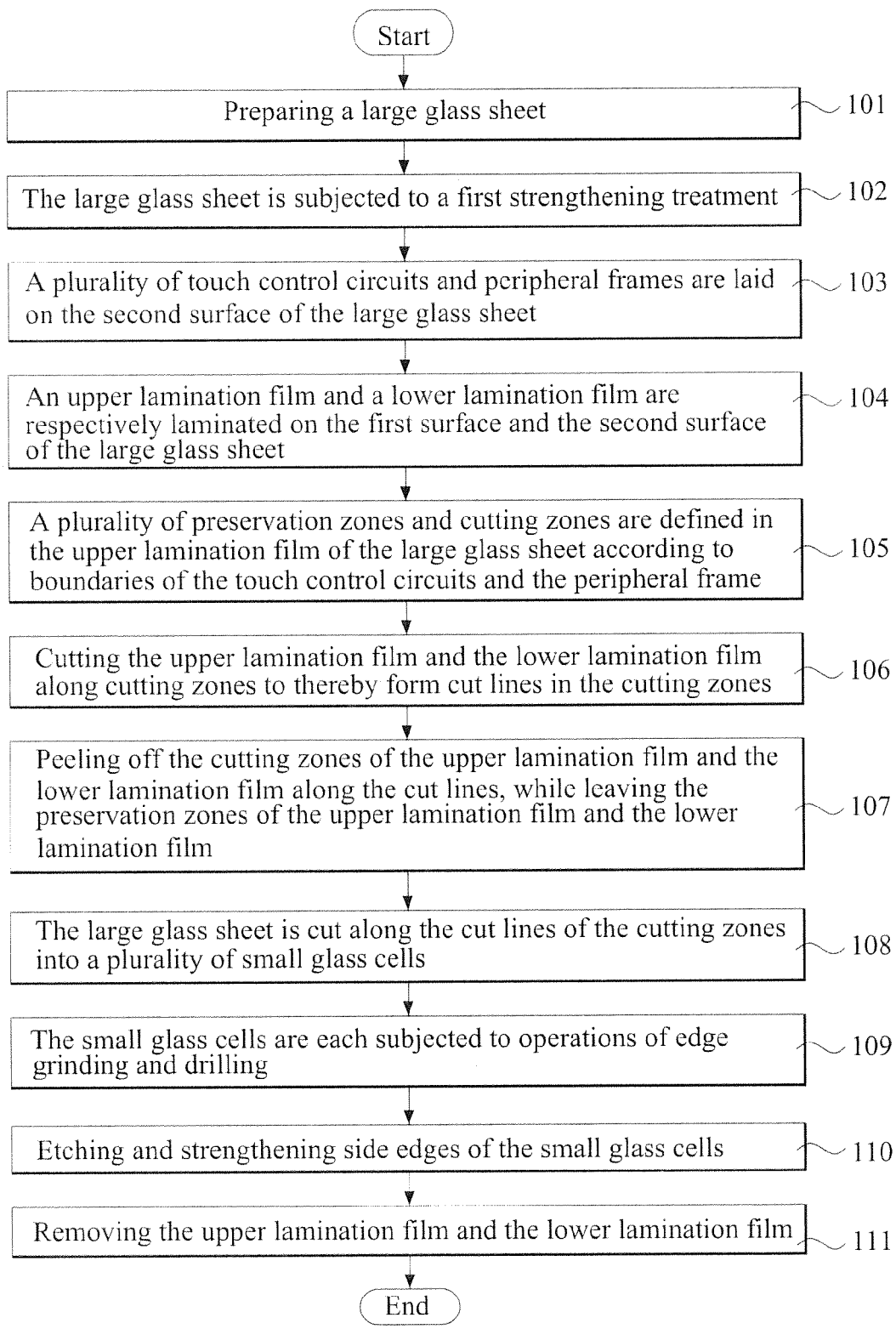
FIG. 1 is a flow chart showing a method according to the present invention.

With reference to FIGS. 1-11, FIG. 1 is a flow chart showing a method according to the present invention and FIGS. 2-11 are schematic views demonstrating the flow of the method of FIG. 1.

Figure 2:
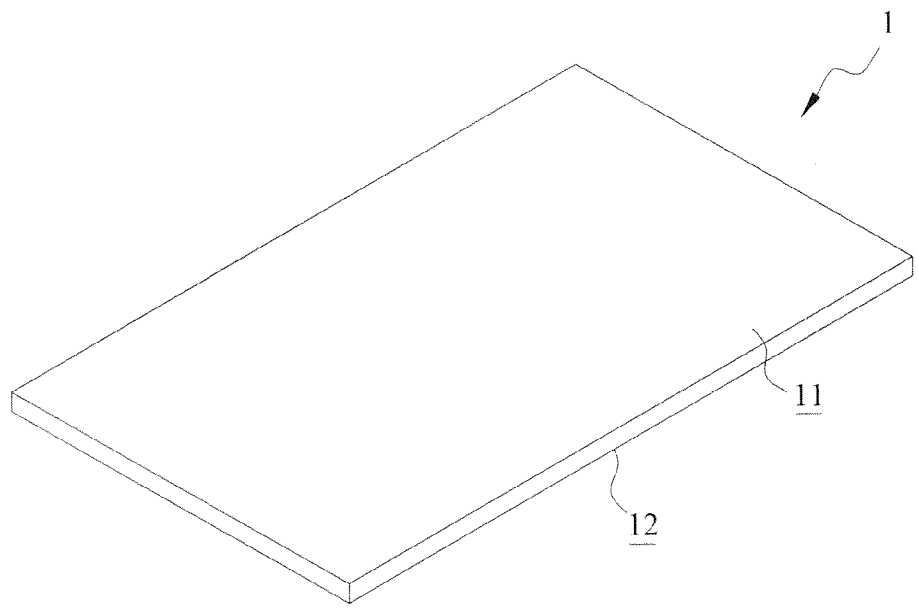
FIG. 2 is a perspective view showing a large glass sheet.

To perform the method according to the present invention, a large glass sheet 1 is first prepared (Step 101). The large glass sheet 1 comprises a first surface 11 and a second surface 12 (as shown in FIG. 2), wherein the first surface 11 provides a user operation surface of a touch control function after a product associated therewith has been completed and the second surface 12 provides a circuit laying surface.

Referring to Step 102, afterwards, the large glass sheet 1 is subjected to a first strengthening treatment. To carry out the strengthening treatment, any one of known chemical strengthening processes and physical strengthening processes can be used to increase the glass hardness of the large glass sheet 1. Taking a chemical strengthening process as an example, generally, the large glass sheet 1 is subjected to a treatment for exchange of ions of sodium and potassium in a high temperature of 450 to 500 degrees Celsius in order to increase glass hardness.

Figure 3:
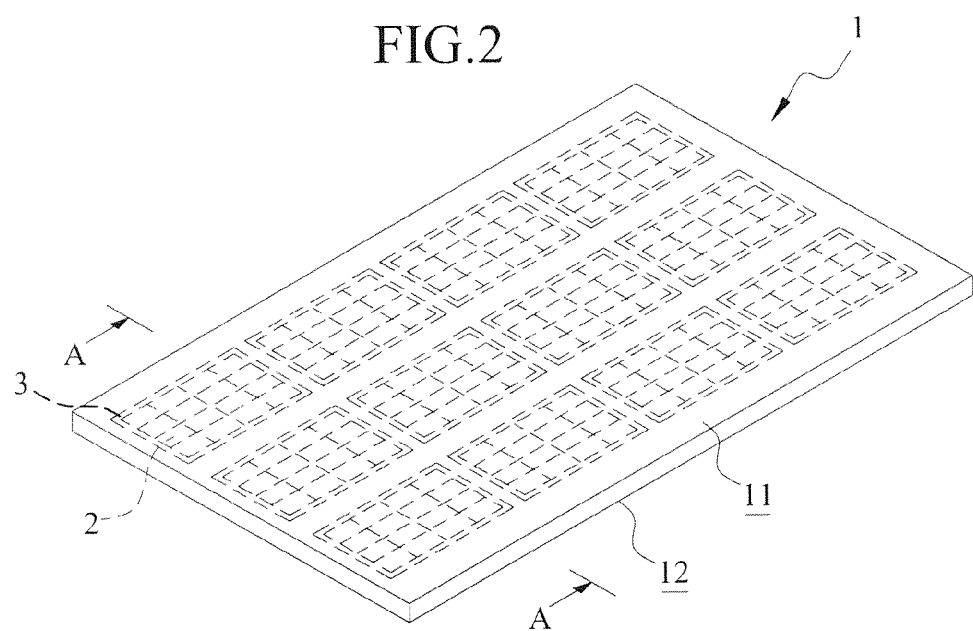
FIG. 3 is perspective view schematically showing the large glass sheet with a plurality of touch control circuits and peripheral frames formed on a second surface thereof according to the present invention.
Figure 4:
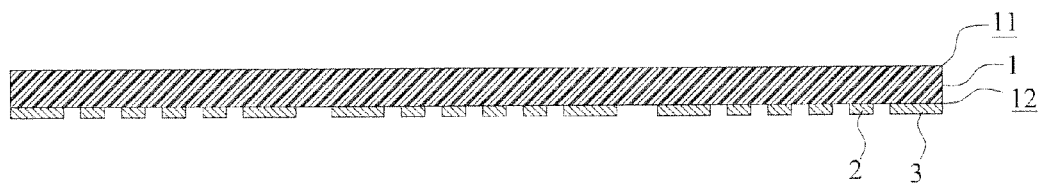
FIG. 4 is a cross-sectional view taken along line A-A of FIG. 3.

Referring to Step 103 and FIGS. 3 and 4, after the completion of the first strengthening treatment, a plurality of touch control circuits 2 and peripheral frames 3 associated with the touch control circuits 2 are laid on the second surface 12 of the large glass sheet 1. The peripheral frames 3 can be peripheral frames of black, white or other colors. FIG. 3 is a perspective view showing the large glass sheet 1 of the present invention with the plurality of touch control circuits 2 and peripheral frames 3 having been laid on the second surface 12. FIG. 4 is a cross-sectional view taken along line A-A of FIG. 3.

Figure 5:
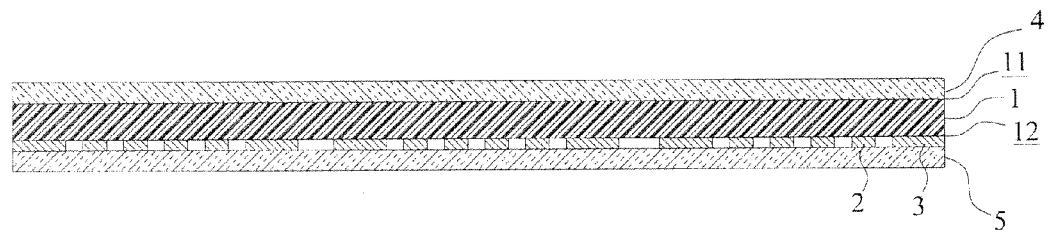
FIG. 5 is a schematic view showing an upper lamination film and a lower lamination film laminated on a first surface and a second surface of the large glass sheet.

Referring to Step 104 and FIG. 5, an upper lamination film 4 and a lower lamination film 5 are respectively laminated on the first surface 11 and the second surface 12 of the large glass sheet 1. The upper lamination film 4 and the lower lamination film 5 are respectively attached to and cover the first surface 11 and the second surface 12 of the large glass sheet 1. The upper lamination film 4 and the lower lamination film 5 are made of materials that are resistant to acid corrosion to prevent scratch of the glass surfaces and provide etch protection of the glass sheet in the subsequent operations.

Figure 6:
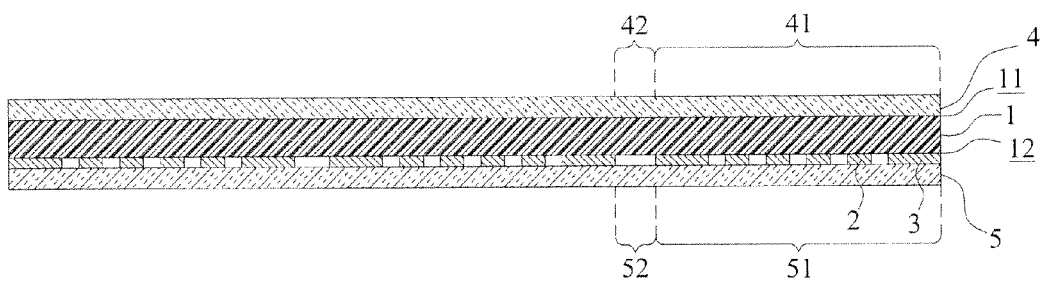
FIG. 6 is a schematic view showing a plurality of preservation zones and cutting zones defined in the large glass sheet.

Referring to Step 105 and FIG. 6, after completion of film lamination of the large glass sheet 1, a plurality of preservation zones 41 and cutting zones 42 are defined in the upper lamination film 4 of the large glass sheet 1 according to boundaries of the touch control circuits 2 and the peripheral frame 3. In other words, the preservation zones 41 are defined to comprises areas that cover the touch control circuits 2 and the peripheral frame 3, while the cutting zones 42 are areas between the touch control circuits 2. Further, a plurality of preservation zones 51 and cutting zones 52 are defined in the lower lamination film 5 of the large glass sheet 1.

Figure 7:
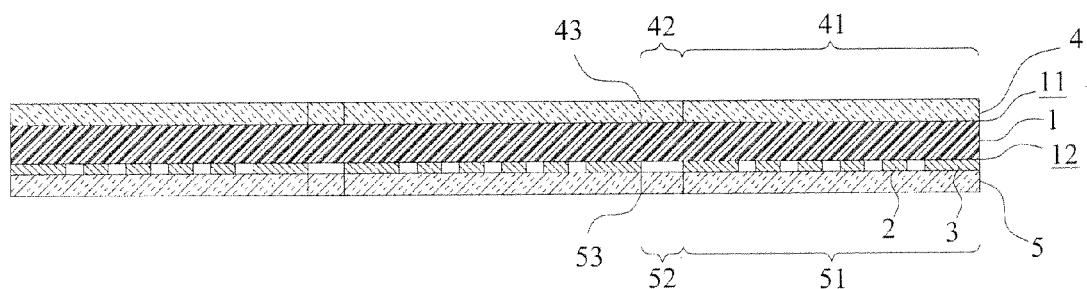
FIG. 7 is a schematic view showing cut lines formed in the cutting zones by subjecting the cutting zones with the film laminated thereon to film cutting.

Referring to Step 106 and FIG. 7, a tool of one of laser, stamping, and cutting die is used to cut along the cutting zones 42 so as to carry out film cutting of the cutting zones 42, 52 of the upper lamination film 4 and the lower lamination film 5 to thereby form cut lines 43, 53 in the cutting zones 42, 52.

Figure 8:
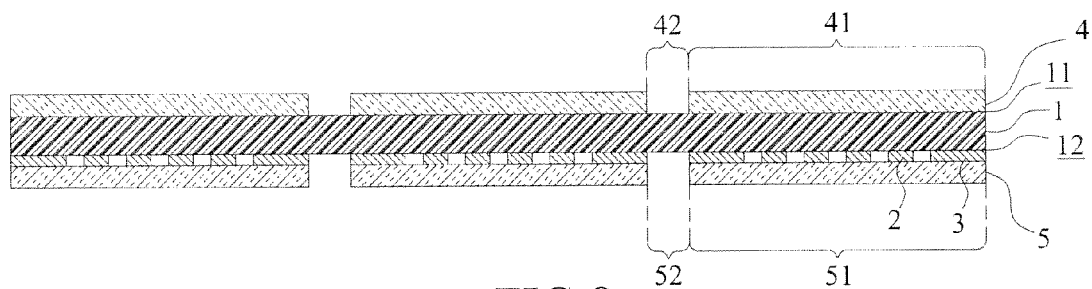
FIG. 8 is a schematic view showing the cutting zones of the lamination films peeled off and the plurality of preservation zones of the upper lamination film and the plurality of preservation zones of the lower lamination film left respectively on the first and second surfaces of the large glass sheet.

Referring to Step 107 and FIG. 8, afterwards, a film peeling operation is performed to peel off the cutting zones 42, 52 of the upper lamination film 4 and the lower lamination film 5 along the cut lines 43, 53, while leaving the plurality of preservation zones 41 of the upper lamination film 4 and the plurality of preservation zones 51 of the lower lamination film 5 respectively on the first surface 11 and the second surface 12 of the large glass sheet 1.

Figure 9:
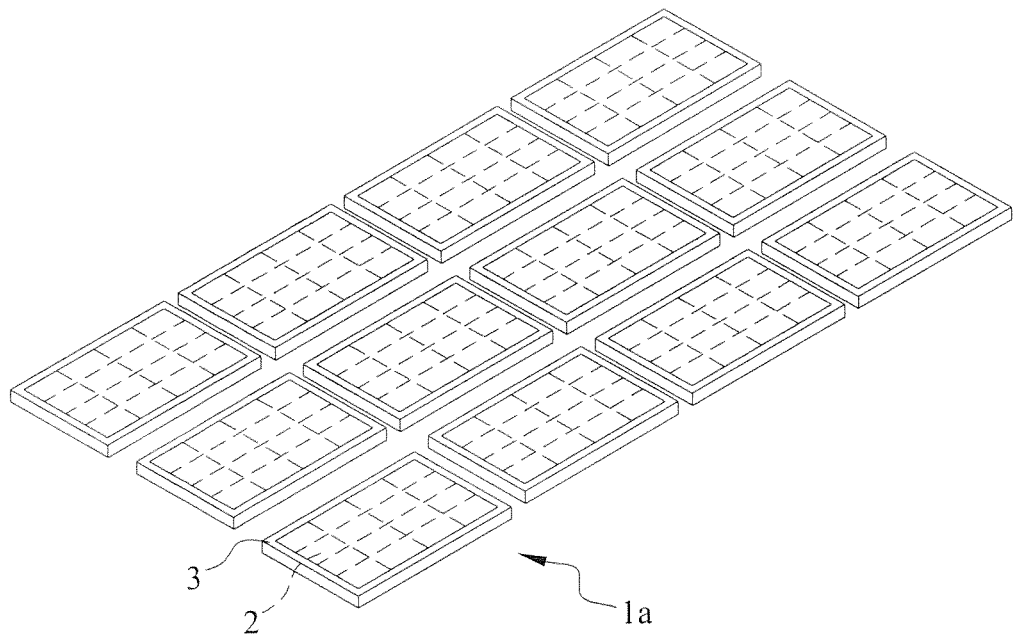
FIG. 9 is a schematic view showing the large glass sheet cut into a plurality of small glass cells along the cutting zones.
Figure 10:
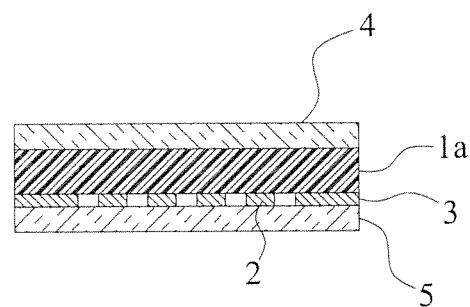
FIG. 10 is a cross-sectional view showing one of the small glass cells.

Referring to Step 108 and FIG. 9, after the completion of film peeling, the large glass sheet 1 is cut, along the cut lines of the cutting zones 42, into a plurality of small glass cells 1a. FIG. 10 is a cross-sectional view showing one of the small glass cells 1a.

Referring to Step 109, the small glass cells 1a are each subjected to operations of edge grinding and drilling. Afterwards, in Step 110, etching and strengthening are applied to side edges of the small glass cells 1a. During the operations of etching and strengthening of the side edges of the small glass cells 1a, tiny fractures and unrecognizable cracking in the side edge of the glass sheet can be removed. Thus, for the small glass cells, this presents an effect of second strengthening treatment, edge smoothening, and edge flattening.

Figure 11:
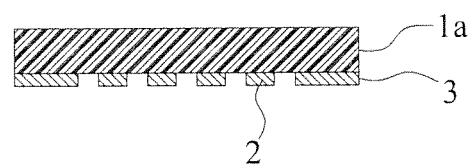
FIG. 11 is a cross-sectional view showing one of the small glass cells after the upper lamination film and the lower lamination film have been removed.

Finally, in Step 111, after the completion of etching and strengthening, the upper lamination film 4 and the lower lamination film 5 are removed. FIG. 11 is a cross-sectional view showing one of the small glass cells 1a from which the upper lamination film 4 and the lower lamination film 5 have been removed.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A method for carrying out edge etching and strengthening of an OGS (One-Glass-Solution) touch panel, comprising the following steps:
   (a) preparing a large glass sheet;
   (b) subjecting the large glass sheet to a first strengthening treatment;
   (c) laying a plurality of touch control circuits and peripheral frames associated with the touch control circuits on a surface of the large glass sheet;
   (d) laminating an upper lamination film and a lower lamination film to a first surface and a second surface of the large glass sheet respectively;
   (e) defining a plurality of preservation zones and cutting zones according to boundaries of the touch control circuits and the peripheral frames, wherein the preservation zones comprise the plurality of touch control circuits and the peripheral frames;
   (f) subjecting the upper lamination film and the lower lamination film to film cutting along the cutting zones so as to form cut lines in the cutting zones;
   (g) peeling off the cutting zones of the upper lamination film and the lower lamination film along the cut lines, while leaving the preservation zones of the upper lamination film and the lower lamination film;
   (h) cutting the large glass sheet into a plurality of small glass cells along the cut lines of the cutting zones; and
   (i) subjecting side edges of the small glass cells to etching and strengthening.

2. The method for carrying out edge etching and strengthening of the OGS touch panel as claimed in claim 1, wherein in Step (d), the upper lamination film and the lower lamination film are made of materials that are resistant to acid corrosion.

3. The method for carrying out edge etching and strengthening of the OGS touch panel as claimed in claim 1, wherein in Step (f), the cut lines are formed by subjecting the upper lamination film and the lower lamination film to film cutting along the cutting zones with one of laser, stamping, and a cutting die.

4. The method for carrying out edge etching and strengthening of the OGS touch panel as claimed in claim 1, wherein Step (h) further comprises a step of subjecting the side edges of the plurality of small glass cells to edge grinding.

5. The method for carrying out edge etching and strengthening of the OGS touch panel as claimed in claim 4, further comprising a step of subjecting the small glass cells to drilling after the edge grinding.

* * * * *